United States Patent [19]

Perrin

[11] Patent Number: 4,789,584
[45] Date of Patent: Dec. 6, 1988

[54] SYNTHETIC SUBSTRATE FOR USE IN THE ROOTING OF CUTTINGS AND THE RAISING OF SEEDLINGS AND PLANTS

[75] Inventor: Alan P. Perrin, Clwyd, Wales
[73] Assignee: Synthetic Substrates Limited, Altrincham, England
[21] Appl. No.: 885,181
[22] Filed: Jul. 14, 1986
[51] Int. Cl.[4] .............................................. B32B 3/10
[52] U.S. Cl. .................................... 428/159; 47/41.12; 47/48.5; 47/64; 47/80; 264/321; 428/160; 428/218; 428/316.6; 428/318.6; 521/905; 521/918
[58] Field of Search ................... 428/11, 23, 158, 159, 428/160, 310.5, 316.6, 318.6, 314.2, 304.4, 311.1, 311.5, 218; 264/321; 47/41.12, 41.13, 64, 80, 48.5; 521/905, 918

[56] References Cited

U.S. PATENT DOCUMENTS

| | | | |
|---|---|---|---|
| 2,765,585 | 10/1956 | Smithers | 47/41.12 |
| 3,873,476 | 3/1975 | Jabs | 428/23 |
| 3,977,406 | 8/1976 | Roth | 428/160 |
| 4,445,298 | 5/1984 | Roder | 428/23 |

Primary Examiner—William J. Van Balen
Attorney, Agent, or Firm—Fleit, Jacobson, Cohn & Price

[57] ABSTRACT

A synthetic substrate for use in the rooting of cuttings and the raising of seedlings, comprising an expanded, semi-rigid, substantially hetero-cellular plastics material having a plurality of regions of relatively low density for receiving cuttings or seedlings to be propagated. The regions of low density are separated by regions of relatively high density which exhibit higher capillarity than the lower density regions.

One way of forming the aforegoing substrate is to subject predetermined regions of a block of foamed polyurethane or other suitable, relatively low density plastics material to heat and pressure whereby to selectively compress and permanently deform the low density foamed material to produce the regions of relatively high density.

The synthetic substrate of the invention may also be in the form of capillary matting for use in supplying water and/or nutrients to plants.

16 Claims, 3 Drawing Sheets

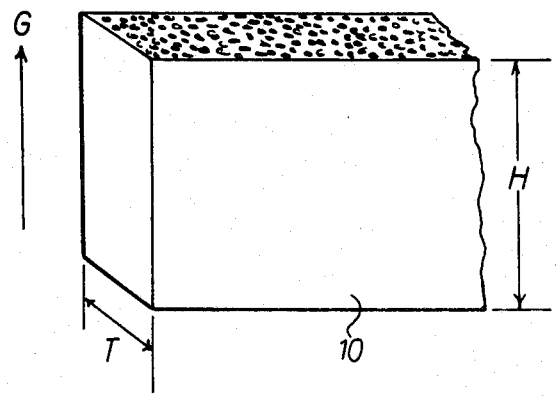
Fig_1
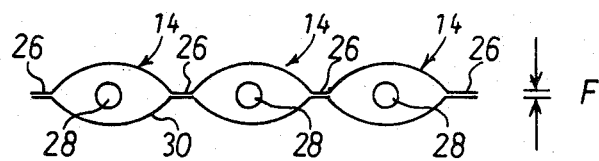
Fig_3
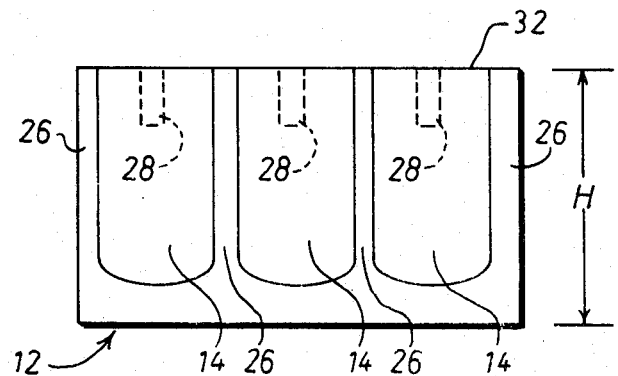
Fig_2

SYNTHETIC SUBSTRATE FOR USE IN THE ROOTING OF CUTTINGS AND THE RAISING OF SEEDLINGS AND PLANTS

DESCRIPTION

The present invention is concerned with synthetic substrates for use in the rooting of cuttings and the raising of seedlings and plants.

The traditional method of rooting cuttings and raising seedlings has involved the use of natural materials such as soil, peat and the like. In recent years, however, such natural materials have been replaced to a large extent by the use of synthetic plastics-based materials. These can be in a wide variety of forms, for example granular, shredded or cellular. It is with the latter, cellular type of material that the present invention is particularly concerned.

To provide the optimum conditions for either the successful rooting of cuttings or seed raising, a synthetic substrate must be permeable both to air and to the developing root structure. It must also be easily wettable by water and exhibit adequate levels of moisture retention.

Where the substrate is a continuous phase (as opposed to granular or shredded particles) cellular plastics material, for example phenolics or polyurethanes, permeability to air and the provision of adequate moisture (and moisture retention) are, to a significant extent, mutually exclusive objectives. This arises as a result of the poor capillarity of conventional cellular materials, consisting of substantially similar pore size.

For example, the manufacturers of expanded phenolic substrates recommend that the water "table" for a cellular block 50 mm in height be maintained at 25 mm., i.e. 50% of the height of the block. This is not only wasteful of water and energy (where bottom heat is provided due to latent heat effect) but also prevents air reaching the roots. This condition is found in practice to promote the undesirable proliferation of "watering" rather than "feeding" roots and increases the susceptibility of the cuttings or seedlings to root-rot.

It is a principal object of the present invention to provide an improved substrate for use in the rooting of cuttings and in the raising of seedlings, wherein the disadvantages of the known substrates are reduced significantly.

The present invention is based on the appreciation that the degree of capillarity of a hetero-cellular plastics material is related to its density—the higher the density, the higher the capillarity. It has been realised that this can be used to advantage to provide efficient watering and aeration of a cutting or seedling using a minimum of water, whilst reducing the likelihood of waterlogging.

In accordance with one aspect of the present invention, there is provided a synthetic substrate for use in the rooting of cuttings and the raising of seedlings, comprising an expanded, semi-rigid, substantially hetero-cellular plastics material having at least one region of relatively low density which exhibits relatively low capillarity and which is arranged, in use, to receive a cutting or seedling to be propagated and at least one region of relatively high density which exhibits higher capillarity than said low density region.

In accordance with a second aspect of the present invention, there is provided a synthetic substrate for use in the rooting of cuttings and the raising of seedlings, comprising an expanded, semi-rigid, substantially hetero-cellular plastics material having a plurality of regions of relatively low density which are adapted to receive, in use, cuttings or seedlings to be propagated, the regions of low density being separated by regions of relatively high density which exhibit higher capillarity than said regions of low density.

In one preferred embodiment, the substrate is in the form of a bandolier having a plurality of said low density regions, separated in the longitudinal direction of the bandolier by narrow strip regions of said higher density.

The low density regions may, for example, be of generally oval transverse section and may contain one or more blind bores for receiving cuttings or seedlings.

In accordance with a still further aspect of the present invention, there is provided a synthetic substrate for use as capillary matting for transmitting water and/or nutrients to plants, characterised by an expanded, semi-rigid, substantially hetero-cellular plastics material having at least one region of relatively low density which exhibits relatively low capillarity and on which, in use, one or more plant containers or trays can be placed, and at least one region of relatively high density disposed below said region of relatively low density and exhibiting higher capillarity than said low density region.

Preferably, the cellular material is a polyurethane foam (either a polyester or a polyether) and the description which follows refers to the base material as being such. However, in practice it is equally possible to use some other foams having similar properties, such as expanded phenolics.

Polyurethanes are thermosetting materials, so that they cannot normally be subsequently thermoformed. If, however, a selected polyurethane is expanded to the degree implicit in a relatively low end density (for example 7.5 kgs/m$^3$), the thickness of the cell walls is reduced to the point where the compression set of the foam is very high. Therefore, when heat and pressure are applied to produce a desired profile, the subsequent deformation is, for all practical purposes, permanent (subject to a degree of dilation when wet).

Because the material is a thermoset, the deformed areas remain cellular. The size and therefore the number of cells per unit volume is, of course, a function of the degree of densification resulting from the induced permanent set.

Thus, in accordance with a further aspect of the invention, there is provided a method forming a synthetic substrate as defined above, wherein one or more predetermined regions of a block of foamed polyurethane or other suitable plastics of relatively low density are subjected to heat and pressure whereby to selectively compress and permanently deform the low density foamed material to produce said region or regions of relatively high density.

Differential densification results in differential pore (cell) size, which increases capillarity. The degree of capillarity can be enhanced further by the design of the profile resulting from said selective compression and deformation. Thus, narrow strips of increased capillarity between the regions of lower density containing the cuttings or seedlings can result in optimum water supply and retention without risk of waterlogging of the cuttings or seedlings themselves. By this means, the areas of greatest moisture retention potentiality can be varied to provide a desired moisture gradient, whilst preserving the required permeability to air.

Other advantages flow from this ability to differentially densify the polyurethane foam. The densified areas have good moisture capacity and retention since the rate of transpiration is decreased. These areas assist in reducing the danger of over-watering by "shedding" excess water. This latter feature is of particular significance where cuttings are misted. In addition, the increased density, particularly in areas which have been reduced to minimum cross-section, exhibit considerably increased tear strength, both when wet and when dry.

The invention is described further hereinafter, by way of example only, with reference to the accompanying drawings, in which;

FIG. 1 shows a portion of a block of cellular plastics material prior to forming in accordance with one aspect of the present invention;

FIG. 2 is a diagrammatic side elevation of one embodiment of a substrate in accordance with this invention, produced from the cellular material component shown in FIG. 1;

FIG. 3 is a plan view of the substrate of FIG. 2;

FIG. 1 shows a block 10 of low density cellular foam material, such as a polyurethane foam or expanded phenolic. The block 10 has a height H, and a thickness T. Such a foam is inherently, substantially hetero-cellular (i.e. open-celled). The material exhibits a "grain" parallel to its "rise", the grain direction being indicated by the arrow G in FIG. 1.

The block of foam 10 shown in FIG. 1 is used as a blank for the formation of the bandolier 12 of individual, low density planting (rooting or cutting) cells 14 shown in FIGS. 2 and 3.

Figure 4:
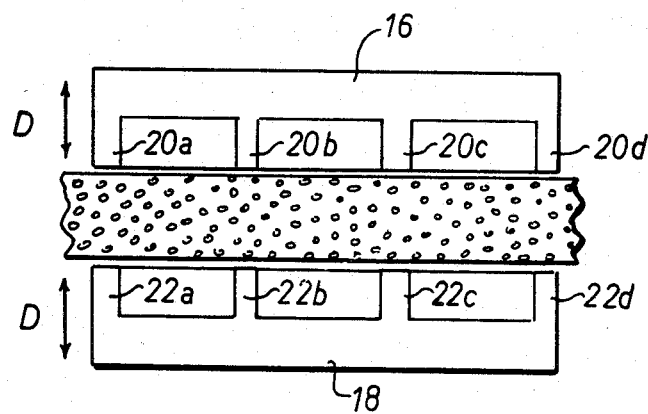
FIG. 4 is a diagrammatic plan view showing a pair of heated platens or jaws for use in forming the substrate of FIGS. 2 and 3.
Figure 5:
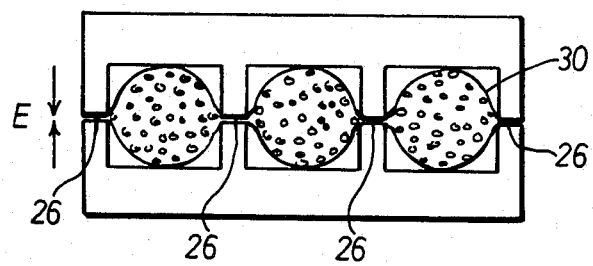
FIG. 5 is a further plan view of the two platens of FIG. 4, showing the platens in their "closed" position.
Figure 6:
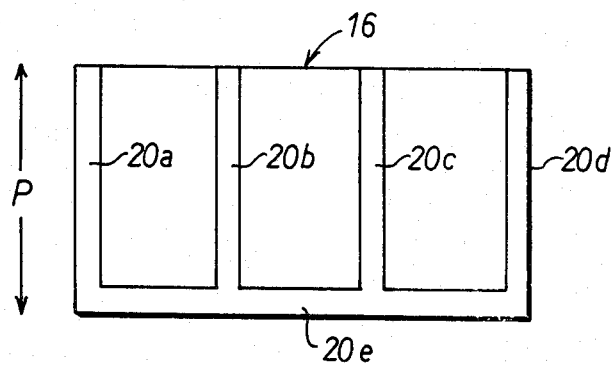
FIG. 6 is a front elevation showing the configuration of one of the platens of FIGS. 4 and 5.

The formation of the bandolier of FIGS. 2 and 3 is achieved by the use of the pair of heated platens 16, 18 shown in FIGS. 4 and 5 which are selectably displaceable towards and away from one another, as indicated by the arrows D in FIG. 4. Each platen 16, 18 carries a respective projecting land 20,22 having the configuration best seen in FIG. 6. Thus, for example, the platen 16 has four vertical land portions 20a, 20b, 20c, 20d interconnected at their lower ends by a horizontal land portion 20e. (In practice, the number of vertical land portions is chosen to suit the length of bandolier required).

The foam blank 10 is placed between the heated platens 16,18 as shown in FIG. 4, the height H of the blank being chosen to be substantially equal to the height P of the platens. The platens 16,18 are then moved towards each other until the opposing lands are separated by a small distance E. A typical value for E might in practice be a distance of the order of 0.06 cms. In this condition, the cellular material between the opposing lands is subjected to heat and pressure and the blank assumes the deformed configuration shown in FIG. 5. When the platens are subsequently moved apart again, the deformation remains and one thus obtains the configuration shown in FIGS. 2 and 3 having (in this case) three areas 14 of relatively low density separated, and surrounded on three sides, by membraneous areas 26 of relatively high density having a thickness F corresponding substantially to the platen spacing E of FIG. 5.

A respective blind bore 28 can be formed in each low density area by any convenient means, for eventually receiving a cutting or seedling to be propagated.

By this means, there is formed a plurality of discrete, low density bandoliered cells 14 having their vertical plane parallel with the grain G of the foam. The exposed side walls 30 of the low density cells 14 have a slightly densified surface, which in turn is contiguous (apart from its upper insertion plane 32) with the highly densified membrane 26.

In use, this structure results in the encouragement of a predominantly downward root development for cuttings and seedlings positioned in the bores 28. All parts of the cells are ultimately permeable to the plants' roots. However, the combination of grain and differential densification initially encourages root growth in a vertical direction rather than laterally. This has the advantage of avoiding root damage when the individual cells are eventually sub-divided.

In one practical example, the original blank has an initial thickness of 1.5 cms. and is chosen to have a density of the order of 7.5 kgs/m$^3$. After formation using the foregoing technique, the core density of the cells 14 remains at 7.5 kgs/m$^3$. However, the surface density of the cells 14 is about 8.75 kgs/m$^3$ and the density of the interconnecting membrane 26 which has a thickness of the order of 0.06 cms. is of the order of 125 kg/m$^3$.

A comparative capillarity test on the latter example revealed the following;

A strip of polyurethane foam 1.5 cms. thick by 4.0 cms. high and 25 cms. long of a density of 7.5 kgs/m$^3$ (representing the base material of the bandolier) was placed in a tray containing pigmented water at a height of 4 mm. Placed in the same tray was a 10 cell bandolier unit made in accordance with the aforegoing technique. Both samples were completely devoid of moisture prior to immersion. Examination after 24 hours revealed the following:

In the case of the undensified foam strip, the average height of the water migration was 16 mm, the foam in this area being waterlogged.

In the case of the bandolier made in accordance with the present invention, water had reached the top of the bandolier. However, it was observed that the water had been absorbed preferentially by the densified regions, i.e. in the interconnecting membranes 26.

Thus, the use of the densified regions provides a means of achieving adequate water supply to cuttings or seedlings in the cells 14 whilst avoiding the problem of waterlogging. Since the roots do not have to sit in water as can happen with known substrates, there is increased aeration of the roots. Furthermore, due to increased capillarity of the densified areas, the water depth into which the substrate must be submerged is very much less than hitherto. Hence the quantity of water necessary can be correspondingly reduced, with a consequential saving in energy requirements.

It should be emphasised that the invention is by no means limited to the particular configuration of cutting or seedling-receiving cell 14 shown in the drawings, and any convenient configuration can be chosen to suit the circumstances. Such cells need not be formed as part of a bandolier. They may, for example, be singly-formed cells or they may be formed from a block divided into parallel rows of cells by two sets of mutually orthogonal dividing grooves or channels. Densified regions are formed in such a block, for example at the bases of the grooves or channels, for achieving enhanced capillarity in accordance with the invention.

Figure 7:
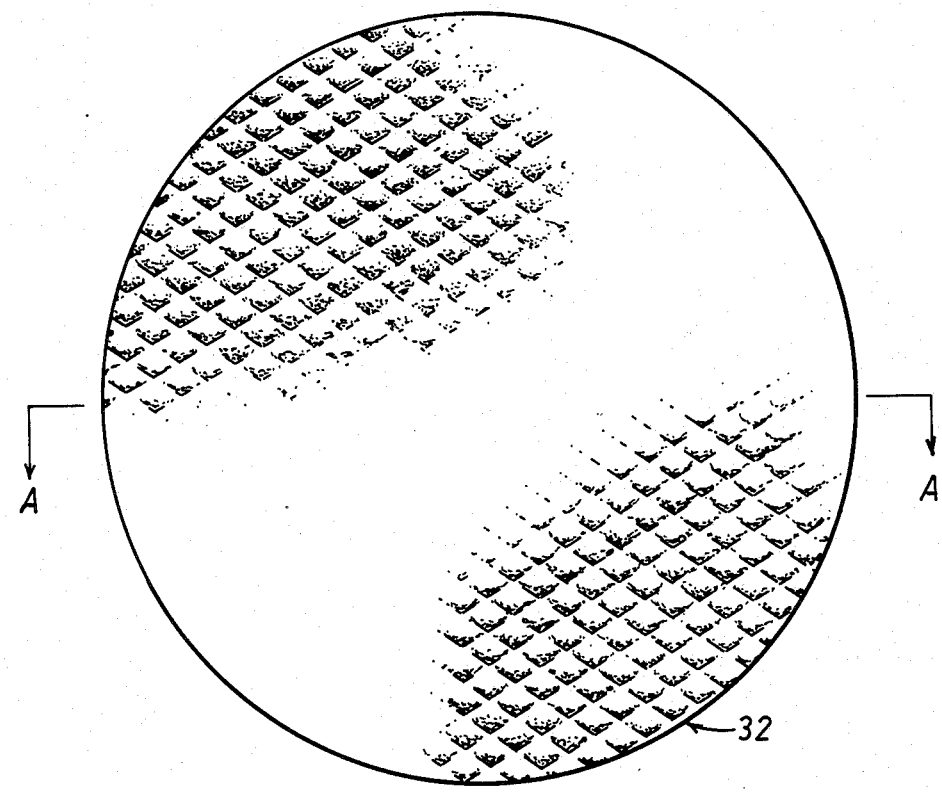
FIG. 7 is a bottom plan view of a further embodiment of the present invention.
Figure 8:
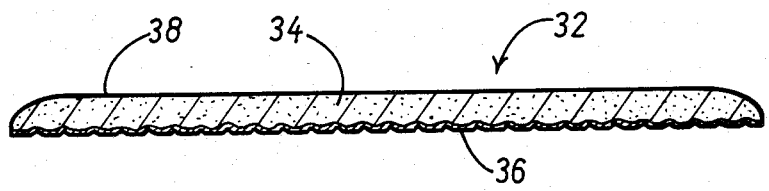
FIG. 8 is a section on the line A—A in FIG. 7.

The invention also has applicability to capillary matting for use in providing water and/or nutrients to plant containers or trays placed thereabove. FIGS. 7 and 8 show one example of such an embodiment in the form of a generally planar disc 32, a major part 34 of which is formed of a low density heterocellular foam material, such as a polyurethane foam or an expanded phenolic. However, the underside of the low density part 34 carries a portion 36 of relatively high density formed, for example, by subjecting one surface of the low density material to selective heat treatment in a heated press. Preferably, at least the underside surface of the higher density part 36 is formed with a pattern of ridges and recesses (for example as shown in FIG. 7) so that when the disc 32 is placed on a flat surface in the orientation shown in FIG. 8, contact is only made with said flat surface by said ridges. The upperside surface 38 of the disc 32 can be plain or profiled/patterned as required.

Although shown as a disc, the matting could have any desired peripheral configuration dependent on the size and shape of the plant trays or containers with which it is to be used.

I claim:

1. A synthetic substrate for use in the rooting of cutting and the raising of seedlings, comprising an expanded, low denisty, semi-rigid, substantially heterocellular plastics material having a first portion of relatively low density which exhibits relative low capillarity, water absorbency and retention capacity, said first portion having an upper end face and a lower end face and having at least one blind bore with an opening in said upper end face for receiving a cutting or seedling to be propagated, and a second portion of relatively high density which exhibits higher capillarity, water absorbency and retention capacity than said first portion, said second portion covering at least the lower end face of said first portion.

2. A synthetic substrate for use in the rooting of cuttings and the raising of seedlings, comprising an expanded, low density, semi-rigid, substantially heterocellular plastics material having a plurality of regions of relative low density, said regions of low density having at least one blind bore for receiving, in use, cuttings or seedlings to be propagated, and the regions of low denisty being separated by regions of relatively high density which exhibit higher capillarity, water absorbency and retention capacity than said regions of low density.

3. A synthetic substrate according to claim 2, wherein the substrate is in the form of a bandolier having a plurality of said low density regions, separated in the longitudinal direction of the bandolier by narrow strip regions of said higher density.

4. A synthetic substrate according to claim 3, wherein the low density regions are of generally oval transverse section.

5. A synthetic substrate for use in the rooting of cuttings and the raising of seedlings, comprising an expanded, low denisty, semi-rigid, substantially heterocellular plastics material haivng a plurality of regions of relatively low density which are adapted to receive, in use, cuttings or seedlings to be propagated, the regions of low density being separated by regions of relatively high density which exhibit higher capillarity, water absorbency and retention capacity than said regions of low density, said substrate being in the form of a bandolier wherein the plurality of low density regions are separated in the longitudinal direction of the bandolier by narrow strip regions of high density, said lower density regions containing at least one blind bore for receiving cutting or seedlings.

6. A synthetic substrate according to claim 1, wherein the cellular material is polyurethane foam or an expanded phenolic.

7. A method for forming a synthetic substrate according to claim 1, wherein predetermind regions of a block of expanded, semi-rigid, substantially hetero-cellular plastics material of relatively low density are subjected to heat and pressure to selectively compress and permanently deform the low density material to produce said second portion of relatively high density and to produce said first portion of relatively low density.

8. A synthetic substrate for use as capillary matting for transmitting water/nutrients to plants comprising an expanded, low density, semi-rigid, substantially heterocellular plastics material having at least one region of relatively low density which exhibits relatively low capillarity, water absorbency and retention capacity and on which, in use, a plant container can be placed, and at least one region of relatively high density disposed below said region of relatively low density and exhibiting higher capillarity, water absorbency and retention capacity than said low density region, said substrate being in the form of a substantially planar lamina with said region of high density forming one surface thereof and said region of low density forming the opposite surface thereof.

9. A method for forming a synthetic substrate according to claim 8, wherein predetermined regions of a block of expanded, semi-rigid, substantially hetero-cellular plastics material of relative low density are subjected to heat and pressure whereby to selectively compress and permanently deform the low density material to produce said at least one region of relatively high density and said at least one region of relatively low density.

10. A bandolier for use in the rooting of cuttings and the raising of seedlings, having a plurality of first regions of generally oval cross section separated in the longitudinal direction of the bandolier by second, narrow, strip regions and having at least one blind bore provided in said plurality of first regions, said first and second regions being formed integrally from an expanded, semi-rigid, substantially hetero-cellular plastics material but said first regions being of a relatively low density so as to exhibit relatively low capillarity while said second narrow, strip regions are of a relatively high density so as to exhibit a relatively higher capillarity than said low density regions.

11. A substrate according to claim 1 wherein said hetero-cellular plastics material has a density of about 7–8 kg/m$^3$.

12. A substrate according to claim 2 wherein said hetero-cellular plastics material has a density of about 7–8 kg/m$^3$.

13. A substrate according to claim 8 wherein said hetero-cellular plastics material has a density of about 7–8 kg/m$^3$.

14. A bandolier according to claim 10 wherein said first regions have a density about 7–8 kg/m$^3$ and said second regions have a density about 125 kg/m$^3$.

15. A synthetic substrate according to claim 1, wherein said first portion has a side wall region extending from said upper end face to said lower end face thereof and wherein said second portion of higher density surrounds said side wall region of said first portion as well as the lower end face thereof.

16. A synthetic substrate according to claim 15 in the form of a bandolier having a plurality of said first portions of low density separated in the longitudinal direction of the bandolier by narrow strip regions formed by said second portions.

* * * * *